(12) United States Patent
Schoemig et al.

(10) Patent No.: US 8,756,987 B2
(45) Date of Patent: Jun. 24, 2014

(54) PROCESS FOR MONITORING THE FUNCTION OF A PARTICULATE FILTER

(75) Inventors: Herbert Schoemig, Stuttgart (DE); Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 447 days.

(21) Appl. No.: 13/053,802

(22) Filed: Mar. 22, 2011

(65) Prior Publication Data
US 2011/0232363 A1 Sep. 29, 2011

(30) Foreign Application Priority Data
Mar. 26, 2010 (DE) .......................... 10 2010 003 324

(51) Int. Cl.
*G01M 15/00* (2006.01)

(52) U.S. Cl.
USPC ...................................................... 73/114.75

(58) Field of Classification Search
USPC ...................................................... 73/114.75
See application file for complete search history.

(56) References Cited

U.S. PATENT DOCUMENTS

| 5,862,661 A * | 1/1999 | Zhang et al. ..................... 60/274 |
| 2006/0059901 A1 * | 3/2006 | Saito et al. ....................... 60/297 |
| 2008/0097678 A1 * | 4/2008 | Huelser et al. ................. 701/101 |

* cited by examiner

*Primary Examiner* — Lisa Caputo
*Assistant Examiner* — Brandi N Hopkins
(74) *Attorney, Agent, or Firm* — Michael Best & Friedrich LLP

(57) ABSTRACT

A process for monitoring a conversion capacity of a particulate filter arranged in an exhaust gas duct of an internal combustion engine to oxidize nitrogen monoxide to nitrogen dioxide over a catalytic coating includes determining a flow resistance of the particulate filter and setting a temperature of the exhaust gas upstream of the particulate filter. A threshold for a change in the flow resistance of the particulate filter is defined. The monitoring process determines that inadequate conversion capacity of the catalytic coating of the particulate filter is reached when a change in the flow resistance of the particulate filter does not reach the defined threshold within a given period of time.

6 Claims, 1 Drawing Sheet

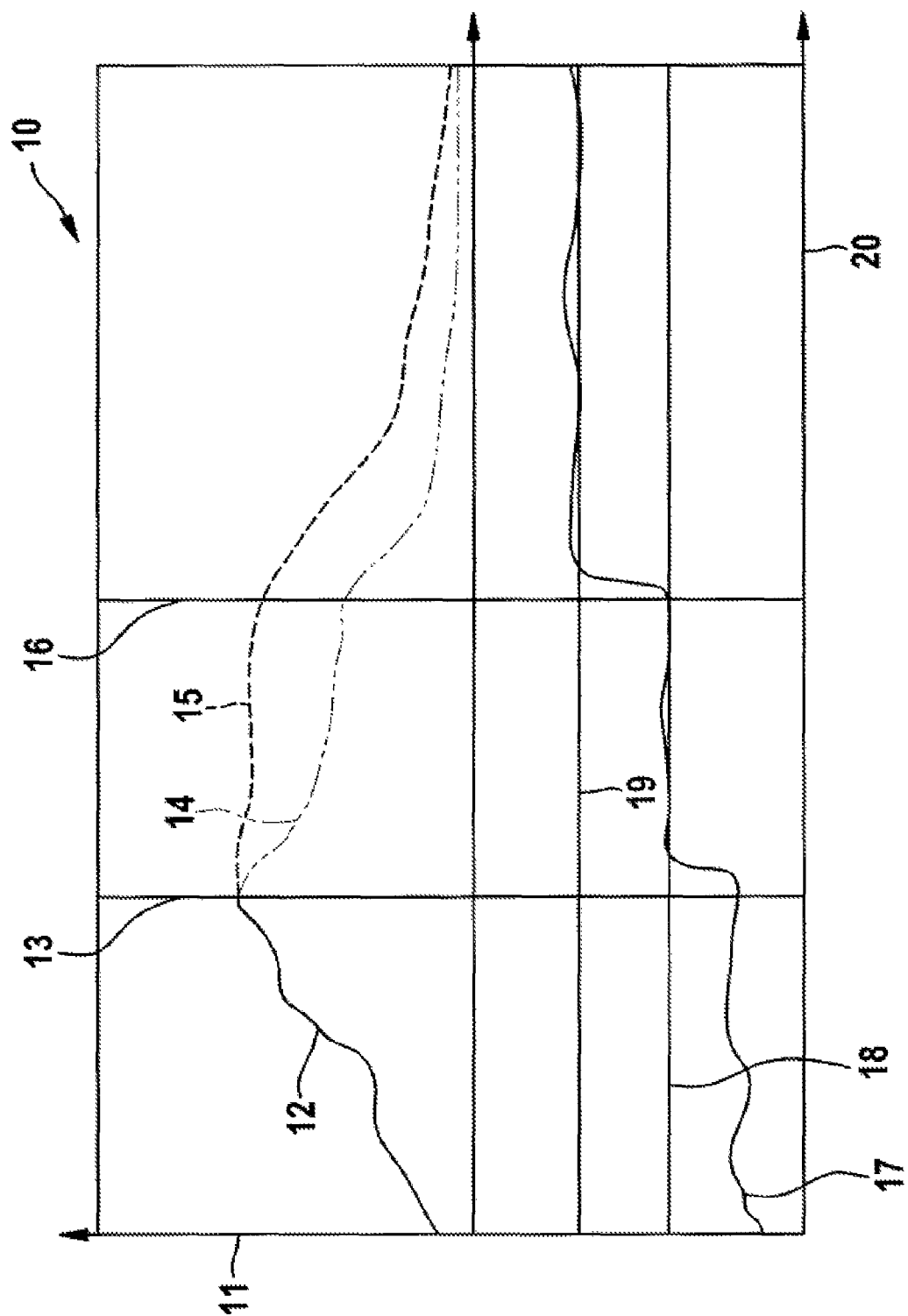

PROCESS FOR MONITORING THE FUNCTION OF A PARTICULATE FILTER

BACKGROUND OF THE INVENTION

The invention relates to a process for monitoring the conversion capacity of a particulate filter arranged in an exhaust gas duct of an internal combustion engine to oxidize nitrogen monoxide to nitrogen dioxide over a catalytic coating, by determining a flow resistance of the particulate filter and by determining the temperature of the exhaust gas upstream of or in the particulate filter.

Particulate filters are used to reduce particulate emissions from diesel engines in the exhaust gas duct of internal combustion engines. The exhaust gas is passed through the particulate filter, which separates out the solid particles present in the exhaust gas and retains them in a filter substrate. As a result of the masses of soot stored in the filter substrate, the particulate filter becomes blocked with time, which is manifested in an increase in the flow resistance and hence in the exhaust gas backpressure. For this reason, the mass of soot stored has to be discharged from time to time.

Legislation requires monitoring of all emission-relevant components, such as exhaust gas aftertreatment components and the accompanying sensor system, in the context of "on-board diagnosis" (OBD) for compliance with thresholds, which are usually specified as a multiple of the emission thresholds. One aspect here is the monitoring of the coating of a particulate filter for a sufficient ability to oxidize nitrogen monoxide to nitrogen dioxide and hence to provide a suitable reagent for an SCR catalyst arranged downstream in the exhaust gas duct (SCR=Selective Catalytic Reaction), in which nitrogen oxides are converted by means of urea to carbon dioxide, nitrogen and water. By monitoring the function of the coating, its ability to oxidize hydrocarbons would simultaneously also be monitored. For diesel oxidation catalysts, such monitoring of the catalytic coating could likewise be required.

According to the prior art, in general, monitoring of components in the context of on-board diagnosis requires restriction of the operating parameters under which the monitoring can be carried out. To improve the distinction between a marginal reject component (best part unacceptable) and a marginally acceptable part (worst part acceptable), the plausibilization functions are then carried out only for a restricted range of one or more of the following parameters: exhaust gas mass flow, exhaust gas volume flow, exhaust gas temperature, speed, injection rate, vehicle speed, ambient pressure, ambient temperature or exhaust gas recycle rate. It is also possible to provide restrictions for mode of operation, status, run time or service life of the internal combustion engine, or for regions of the signals for nitrogen oxide, hydrocarbon, carbon monoxide, particulate mass or oxygen concentration. Some monitoring methods also envisage performing the monitoring only in the case of steady-state or quasi-steady-state operating conditions of the internal combustion engine.

SUMMARY OF THE INVENTION

It is therefore an object of the invention to specify a process which enables monitoring of the coating of a diesel particulate filter for sufficient ability to oxidize nitrogen monoxide to nitrogen dioxide within an extended operating range.

The object of the invention is achieved by defining a threshold for a change in the flow resistance of the particulate filter, and by concluding inadequate conversion capacity of the catalytic coating of the particulate filter when the change in the flow resistance of the particulate filter does not reach the defined threshold within a given period of time. Over the catalytic coating, under suitable operating conditions, nitrogen monoxide is oxidized to nitrogen dioxide, which in turn reacts with soot particles. This reaction reduces the flow resistance of the particulate filter caused by the soot particles, and hence the volume flow-dependent pressure differential of the exhaust gas stream between the inlet and outlet side of the particulate filter. When the catalytic coating is no longer sufficiently active, there is insufficient conversion of nitrogen monoxide to nitrogen dioxide in the temperature range selected, the soot particles cannot react with nitrogen dioxide and the flow resistance changes to a lesser degree than the defined threshold. Instead of a threshold for the change in the flow resistance, it is also possible to define a threshold for the absolute value of the flow resistance or a parameter derived therefrom. The flow resistance can be determined from a pressure differential between the inlet and outlet side of the particulate filter taking account of the volume flow of the exhaust gases. The monitoring of the conversion capacity of the catalytic coating for nitrogen monoxide shows the physicochemical activity thereof. At the same time, this also monitors the ability thereof to oxidize hydrocarbons.

The process can be carried out without active intervention into the operating parameters of the internal combustion engine by observing the flow resistance or the pressure differential and comparing with defined thresholds, or it is possible in a controlled manner to set parameters of the internal combustion engine, such as a suitable exhaust gas temperature or a nitrogen oxide concentration.

When a monitoring cycle is undertaken at the start of a regeneration phase of the particulate filter, the soot loading of the particulate filter is so high that a particularly readily detectable difference in the flow resistance occurs when a reaction of the soot particles with nitrogen dioxide takes place, since the start value of the flow resistance is particularly high. In addition, the process in this case can be implemented in a particularly energy-saving manner since a temperature rise, as required for activation of the catalyst, is likewise required for the subsequent burnoff of the soot particles and need not be effected independently for the monitoring.

When the temperature of the exhaust gas upstream of the particulate filter is set to a value between 300° C. and 500° C., preferably to a value between 320° C. and 400° C., particularly great differences arise between an intact catalytic coating and a coating classified as deficient. At higher temperatures, burnoff of the soot particles even in the case of an inadequate catalytic coating leads to a fall in the flow resistance. The setting of the exhaust gas temperature enables particularly constant and reproducible conditions for performance of the process.

Advantageously, the temperature of the exhaust gas upstream of the particulate filter can be set by means of internal engine measures, by late post-injection of fuel or by metering of hydrocarbons into the exhaust gas duct. In many cases, a temperature sensor is already present in the exhaust gas duct, such that it is possible in an inexpensive and precise manner to set the exhaust gas temperature in the exhaust gas duct by means of a temperature sensor with assigned control system.

When the nitrogen oxide concentration in the exhaust gas is raised by reducing the exhaust gas recycle rate, sufficient nitrogen oxide is available and can be oxidized over the catalytic coating, and the effect on the flow resistance of the particulate filter is particularly great.

In an advantageous extension of the field of use, the process can be used for monitoring the conversion capacity of a catalytic coating of a diesel oxidation catalyst upstream of the particulate filter. In a correctly converting diesel oxidation catalyst with intact catalytic coating, nitrogen dioxide is obtained, which can react in the downstream particulate filter with the soot deposited there, and hence leads to reduction in the flow resistance. When the diesel oxidation catalyst, in contrast, does not sufficiently convert the nitrogen monoxide to nitrogen dioxide, the change in the flow resistance in the particulate filter is reduced. The process can thus serve to assess the conversion of the diesel oxidation catalyst, of the particulate filter or of both.

BRIEF DESCRIPTION OF THE DRAWINGS

The invention is illustrated in detail hereinafter with reference to a working example shown in the FIGURE. The FIGURE shows:

FIG. 1—a plot of temperature and flow resistance of a particulate filter against time.

DETAILED DESCRIPTION

FIG. 1 shows, plotted in a time plot 10 along a time axis 20 and a signal axis 11, a flow resistance profile 12 of a particulate filter against time. In the lower part of the time plot 10, a temperature profile 17 of the exhaust gas through the particulate filter is plotted. In a first phase, the value of the flow resistance profile 12 increases as a result of deposition of soot particles. The temperature profile 17 shows values which correspond to normal driving operation. At the start of a monitoring phase 13, the flow resistance has increased to such an extent that changes can be determined readily. By means of internal engine measures, the temperature of the exhaust gas is raised into a first temperature range 18 with values at 370° C. In the case of an intact particulate filter, the flow resistance then shows a first profile 14, which is characterized in that the reaction of soot particles with nitrogen dioxide decreases the flow resistance. In the case of a particulate filter with defective catalytic coating, the flow resistance shows a second profile 15, which is characterized in that the flow resistance in the monitoring phase is substantially constant. On commencement of regeneration 16, the temperature of the exhaust gas is raised further, such that the temperature profile 17 enters a second temperature range 19 of 620° C. Here, soot particles are burnt to give carbon dioxide, and the first profile 14 of the flow resistance falls further. At this high temperature, in the second profile 15 too, in the case of a particulate filter with defective catalytic coating, a decline in the flow resistance is observed.

What is claimed is:

1. A process for monitoring a conversion capacity of a particulate filter arranged in an exhaust gas duct of an internal combustion engine to oxidize nitrogen monoxide to nitrogen dioxide over a catalytic coating, the process comprising:
adjusting a temperature of the exhaust gas upstream of the particulate filter over time;
monitoring a change in a flow resistance of the particulate filter over time; and
based on the monitored change in flow resistance over time, determining that inadequate conversion capacity of the catalytic coating of the particulate filter is reached when the monitored change in the flow resistance of the particulate filter does not reach a defined threshold within a given period of time.

2. The process according to claim 1, wherein the step of monitoring the change in flow resistance occurs at a start of a regeneration phase of the particulate filter.

3. The process according to claim 1, wherein the step of adjusting the temperature includes setting the temperature of the exhaust gas upstream of the particulate filter is set to a value between 300° C. and 500° C.

4. The process according to claim 3, wherein the step of adjusting the temperature includes setting the temperature of the exhaust gas upstream of the particulate filter to a value between 320° C. and 400° C.

5. The process according to claim 1, wherein the step of adjusting the temperature includes setting the temperature of the exhaust gas upstream of the particulate filter by at least one of means of internal engine measures, late post-injection of fuel, and metering of hydrocarbons into the exhaust gas duct.

6. The process according to claim 1, further comprising using the process to monitor the conversion capacity of a catalytic coating of a diesel oxidation catalyst upstream of the particulate filter.

* * * * *